(12) United States Patent
Short et al.

(10) Patent No.: US 9,194,254 B2
(45) Date of Patent: Nov. 24, 2015

(54) REDUCED VELOCITY VALVE

(75) Inventors: Keith E. Short, Rockford, IL (US); Michael R. Blewett, Stillman Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 736 days.

(21) Appl. No.: 13/481,155

(22) Filed: May 25, 2012

(65) Prior Publication Data

US 2013/0313049 A1 Nov. 28, 2013

(51) Int. Cl.
| | | |
|---|---|---|
| F01D 25/20 | (2006.01) | |
| F01M 11/08 | (2006.01) | |
| F16N 7/38 | (2006.01) | |
| F16N 39/00 | (2006.01) | |
| F01D 25/18 | (2006.01) | |

(52) U.S. Cl.
CPC ............. *F01D 25/18* (2013.01); *F01D 25/20* (2013.01)

(58) Field of Classification Search
CPC .................................. F16N 7/38; F16N 39/00
USPC ....................................................... 184/6.23
See application file for complete search history.

(56) References Cited

U.S. PATENT DOCUMENTS

| | | | |
|---|---|---|---|
| 347,213 A | 8/1866 | Walker | |
| 58,496 A | 10/1866 | Speakman | |
| 1,218,030 A | 3/1917 | Witmer | |
| 1,346,921 A | 7/1920 | Terry | |
| 1,881,272 A | 10/1932 | Grilli | |
| 1,919,233 A * | 7/1933 | Lee | 137/556.3 |
| 2,385,798 A | 12/1942 | Davis | |
| 2,341,394 A * | 2/1944 | Sloan | 251/120 |
| 2,432,130 A * | 12/1947 | Serrell et al. | 184/6.13 |
| 2,659,388 A | 2/1949 | Rand | |
| 3,485,474 A * | 12/1969 | Baumann | 251/121 |
| 3,628,564 A | 12/1971 | Bishop et al. | |
| 3,662,137 A | 5/1972 | Cleaveland | |
| 4,044,991 A * | 8/1977 | Waller | 251/122 |

(Continued)

FOREIGN PATENT DOCUMENTS

| | | |
|---|---|---|
| GB | 949807 | 2/1964 |
| JP | 2006291848 A | 10/2006 |

(Continued)

OTHER PUBLICATIONS

Extended European Search Report issued in EP Application No. 13165617.5, mailed Nov. 7, 2014, 4 pages.

(Continued)

*Primary Examiner* — William E Dondero
*Assistant Examiner* — Mark K Buse
(74) *Attorney, Agent, or Firm* — Cantor Colburn LLP (57) ABSTRACT

A lube system is provided and includes an air-oil tank including a deaerator configured to remove a first quantity of oil from a first air-oil supply to generate a second air-oil supply having a second quantity of oil, which is smaller than the first quantity of oil, the air oil tank being configured to output the second air-oil supply to an air vent line, a de-oiler disposed along the air vent line and configured to remove from the second air-oil supply oil mist including oil droplets of a minimum size and a pressure regulating valve (PRV) disposed along the air vent line between the air-oil tank and the de-oiler to regulate fluid pressures within the air-oil tank, the PRV being configured to encourage formation of the oil droplets of at least the minimum size.

11 Claims, 8 Drawing Sheets

(56) References Cited

U.S. PATENT DOCUMENTS

| | | | |
|---|---|---|---|
| 4,350,179 A | 9/1982 | Bunn et al. | |
| 5,004,407 A * | 4/1991 | Hutchison | 418/1 |
| 5,114,446 A | 5/1992 | Giesdorf et al. | |
| 5,201,845 A * | 4/1993 | Allmon et al. | 415/169.1 |
| 5,716,423 A | 2/1998 | Krul et al. | |
| 5,718,744 A * | 2/1998 | Ehlert | 96/189 |
| 5,837,018 A | 11/1998 | Goerg | |
| 5,858,070 A | 1/1999 | Halm et al. | |
| 6,029,638 A | 2/2000 | Funai et al. | |
| 6,033,450 A | 3/2000 | Krul et al. | |
| 6,328,069 B1 | 12/2001 | Schumann et al. | |
| 6,651,636 B1 | 11/2003 | Albright | |
| 7,017,546 B1 | 3/2006 | Patel et al. | |
| 7,017,563 B2 | 3/2006 | Dworatzek et al. | |
| 7,174,882 B2 | 2/2007 | Hezel et al. | |
| 7,422,612 B2 | 9/2008 | Pietschner | |
| 7,677,229 B2 | 3/2010 | Lemke et al. | |
| 8,002,864 B2 | 8/2011 | Earith et al. | |
| 8,051,952 B2 | 11/2011 | Bart et al. | |
| 8,152,133 B2 | 4/2012 | Meinig et al. | |
| 8,245,818 B2 * | 8/2012 | Alecu | 184/11.2 |
| 2004/0053546 A1 | 3/2004 | Matsuda et al. | |
| 2009/0101444 A1* | 4/2009 | Alecu | 184/11.2 |
| 2010/0252768 A1 | 10/2010 | Caprera | |
| 2010/0307167 A1 | 12/2010 | Morreale | |

FOREIGN PATENT DOCUMENTS

| | | |
|---|---|---|
| JP | 2006291849 A | 10/2006 |
| JP | 2008064071 A | 3/2008 |
| JP | 2009133283 A | 6/2009 |

OTHER PUBLICATIONS

Extended European Search Report issued in EP Application No. 13168994.5; mailed Apr. 17, 2015; 6 pages.

* cited by examiner

REDUCED VELOCITY VALVE

BACKGROUND OF THE INVENTION

The subject matter disclosed herein relates to a reduced velocity valve and, more particularly, to a reduced velocity valve for use with a lubrication ("lube") system of, for example, an aircraft engine.

Aircraft lubricating systems often incorporate a system for pressurizing a lube pump suction above ambient pressure. This is especially important when the aircraft is designed to fly at high altitudes where the local air pressure is very low. The elevated suction pressure helps the pump fill with oil and prevents cavitation in the lube pump, which can damage the pumping elements. The pressurization is often accomplished by pressurizing the lube reservoir (i.e., the oil tank) by placing a pressure regulating valve on the tank that restricts the flow of air that exits the top of the tank's deaerator via a vent line. This elevates the pressure inside the tank, which then pressurizes the line from the tank that feeds the lube pump suction.

The air flowing along the vent line then passes to a de-oiler that is designed to remove oil droplets from the vent air flow. The de-oiler is effective at removing oil mist droplets when they are larger than a certain minimum size. Droplets smaller than this may pass through the de-oiler and exit via the vent line.

BRIEF DESCRIPTION OF THE INVENTION

According to one aspect of the invention, a lube system is provided and includes an air-oil tank including a deaerator configured to remove a first quantity of oil from a first air-oil supply to generate a second air-oil supply having a second quantity of oil, which is smaller than the first quantity of oil, the air oil tank being configured to output the second air-oil supply to an air vent line, a de-oiler disposed along the air vent line and configured to remove from the second air-oil supply oil mist including oil droplets of a minimum size and a pressure regulating valve (PRV) disposed along the air vent line between the air-oil tank and the de-oiler to regulate fluid pressures within the air-oil tank, the PRV being configured to encourage formation of the oil droplets that are large enough to be effectively removed by the deoiler.

According to another aspect of the invention, a lube system is provided and includes an air-oil tank configured to output a processed air-oil supply to an air vent line, a de-oiler disposed along the air vent line and configured to remove from the processed air-oil supply oil droplets of a minimum size and a pressure regulating valve (PRV) disposed along the air vent line between the air-oil tank and the de-oiler to regulate fluid pressures within the air-oil tank, the PRV being configured to encourage formation of the oil droplets of at least the minimum size.

According to yet another aspect of the invention, a method of operating a lube system is provided and includes removing within an air-oil tank a first quantity of oil from a first air-oil supply to generate a second air-oil supply having a second quantity of oil, which is smaller than the first quantity of oil, removing from the second air-oil supply oil mist including oil droplets of a minimum size, and, prior to the removing of the oil mist, encouraging formation of the oil droplets of at least the minimum size while regulating fluid pressures within the air-oil tank.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

While the prior art systems may be generally satisfactory, it has been discovered that a problem may exist, however, in that mist and, particularly, oil mist is often observed escaping the de-oiler vent line. Though the oil lost does not create an oil consumption problem, the mist creates concern with engine operators. The cause of the oil mist has been investigated and traced to oil atomized by the PRV as the air-oil mixture passes through the PRV at such high velocities and energies that the atomized oil has particle sizes that are frequently too small for the de-oiler to effectively remove.

Outright removal of the PRV could correct the problem of oil mist production, but will lead to reductions in the suction pressure available to the lube pump and may cause cavitation that will shorten pump life.

In accordance with aspects of the present invention, a lube system is provided, which is configured to encourage formation of oil droplets that are large enough to be efficiently removed. The velocity of air that passes through a valve seat area of a pressure regulating valve (PRV) of a lube system is reduced so that the energy in the air is insufficient to produce the mist particles described above. Thus, any particles produced by the PRV will be large enough to be separated out by a de-oiler and visible mist will be substantially reduced or eliminated.

Figure 1:
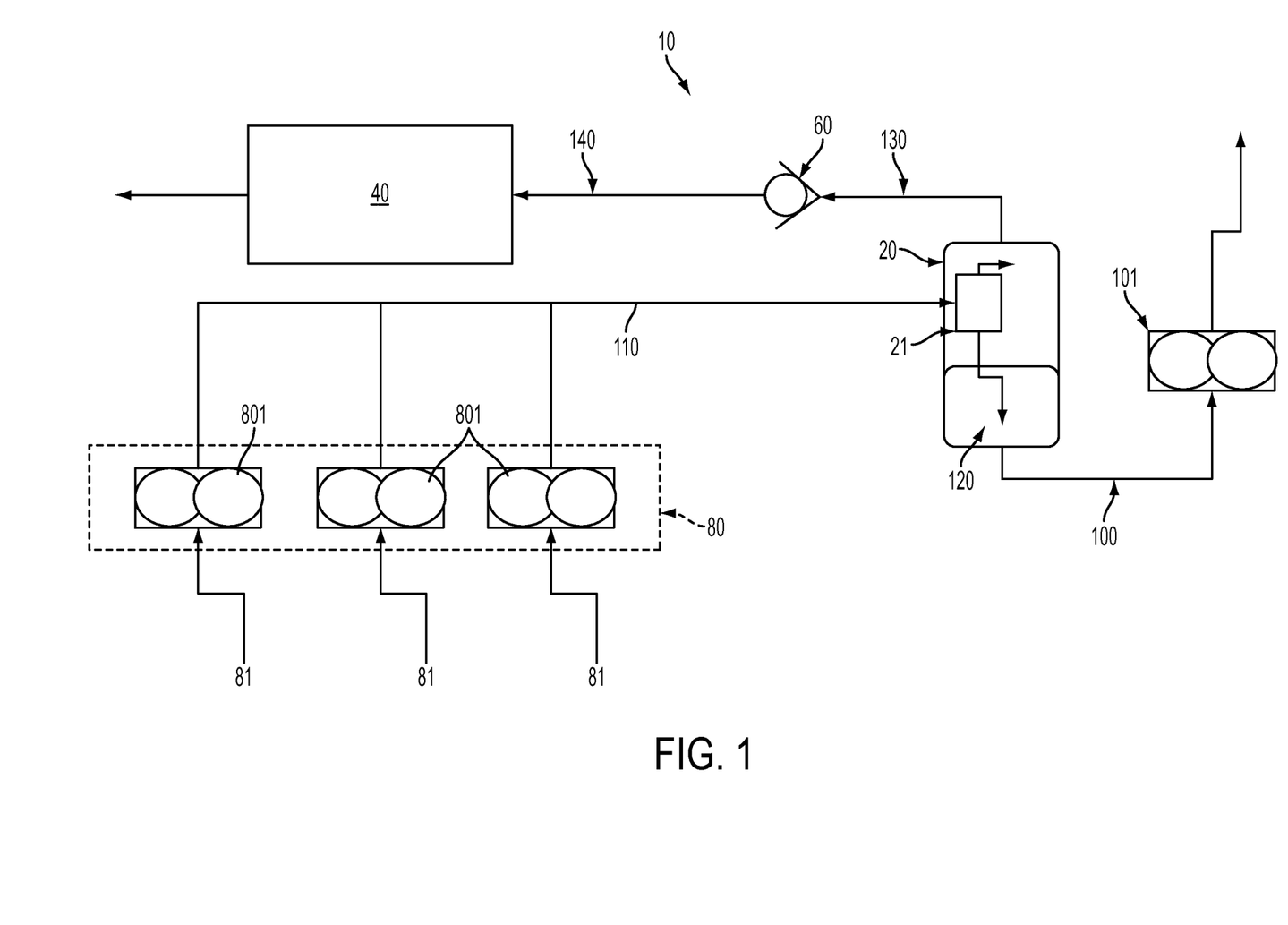
FIG. 1 is a schematic diagram of a lube system.

With reference to FIG. 1, a lube system 10 is provided and includes an air-oil tank 20, a de-oiler 40 and a PRV 60. The lube system 10 further includes a scavenge pump unit 80 and a lube pump suction line 100. The scavenge pump unit 80 includes a plurality of scavenge pumps 801, which are each configured to pump a mixture of air and oil away from, for example, various aircraft engine locations 81, and to pump that air and oil to the air-oil tank 20 as a first air-oil supply 110. The lube pump suction line 100 and lube pump 101 serve to pump from the air-oil tank 20 at least a portion of a first quantity of oil 120 that is removed from the first air-oil supply 110 to the exemplary various aircraft engine locations 81.

The air-oil tank 20 includes a deaerator 21. The deaerator 21 is configured to remove the first quantity of oil 120 from the first air-oil supply 110 to generate a second or processed air-oil supply 130. The second air-oil supply 130 is composed of about 99% air and thus has a second quantity of oil, which is generally smaller than the first quantity of oil 120. An exhaust port of the air-oil tank 20 is coupled to an air-vent line 140 and, as such, the air-oil tank 20 is configured to output the second air-oil supply 130 to the air-vent line 140.

The de-oiler 40 is disposed along the air-vent line 140 and is configured to remove oil mist from the second air-oil supply 130. The oil mist that is removed by the de-oiler 40 generally includes those oil droplets of a minimum size or larger. That is, the de-oiler 40 may fail to remove from the second air-oil supply 130 those oil droplets that are smaller than the minimum size. The PRV 60 is disposed along the air-vent line 140 between the air-oil tank 20 and the de-oiler 40 and is configured to regulate fluid pressures within the air-oil tank 20. In accordance with aspects of the present invention, at least the PRV 60 is further configured to encourage formation of the oil droplets of at least the minimum size such that a substantial amount of the oil may be removed from the second air-oil supply 130 by the de-oiler 40.

Figure 2:
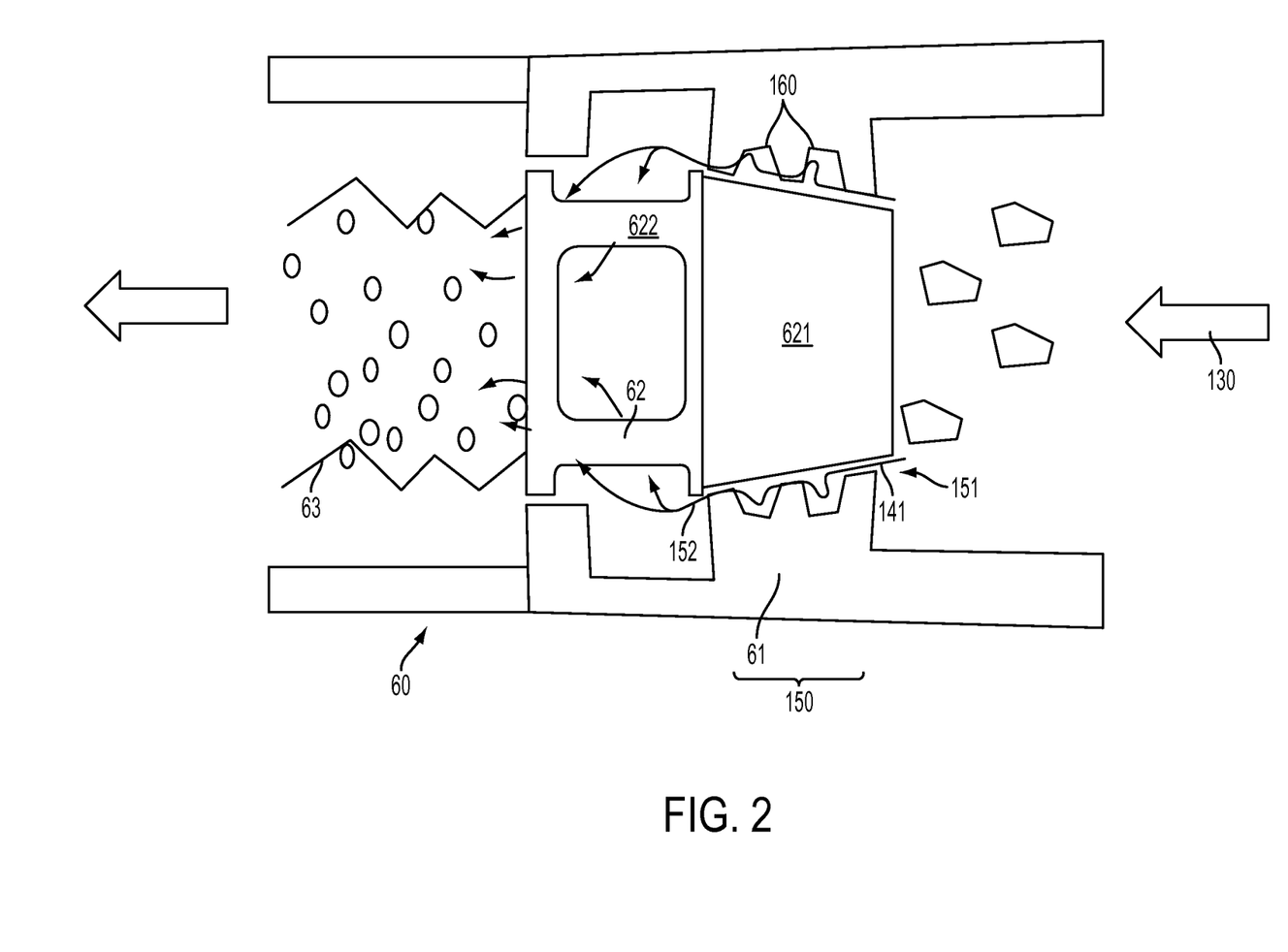
FIG. 2 is a schematic side view of a pressure regulating valve of the lube system of FIG. 1 according to alternative embodiments.
Figure 3:
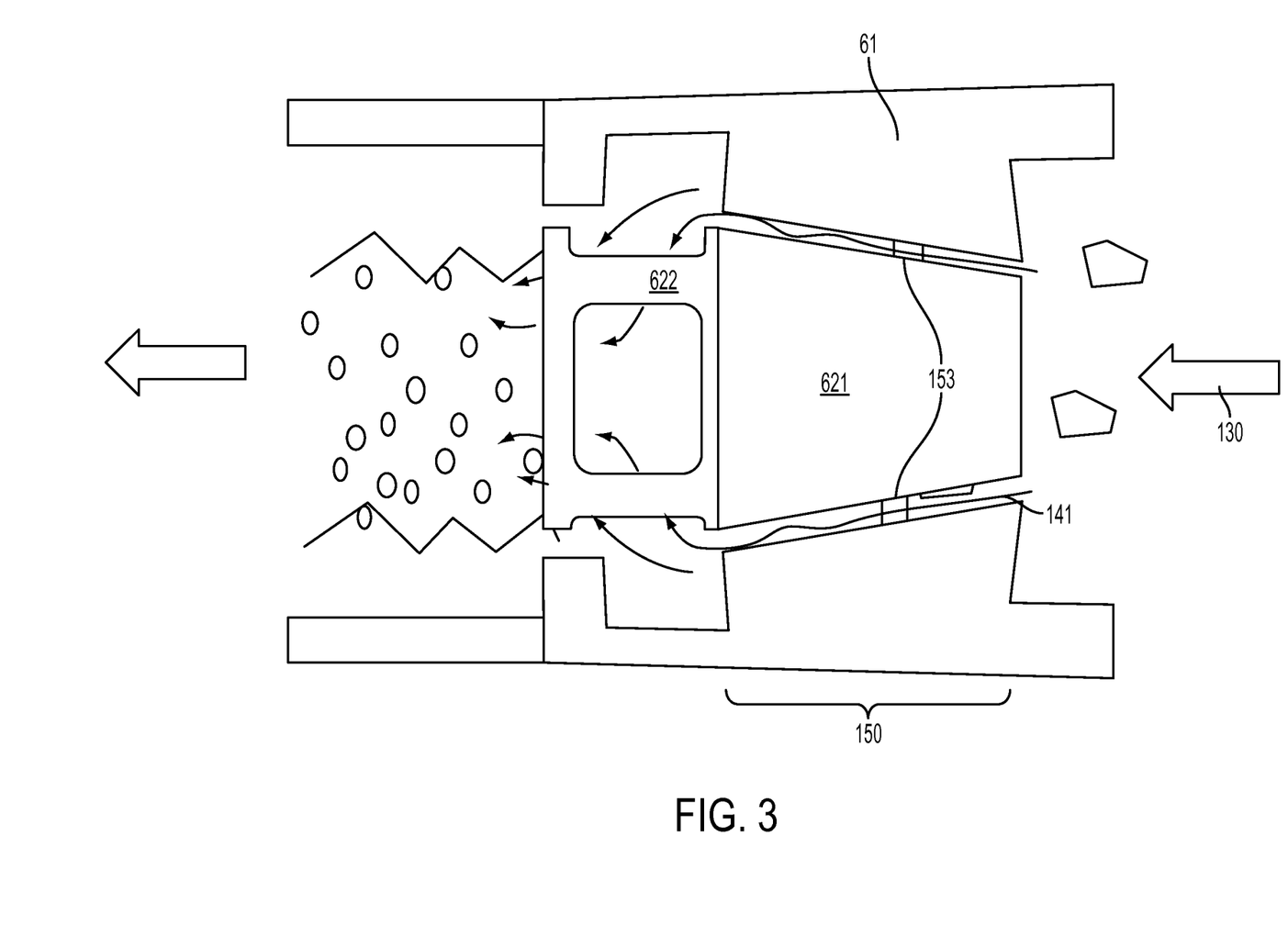
FIG. 3 is a schematic side view of a pressure regulating valve of the lube system of FIG. 1 according to alternative embodiments.
Figure 4:
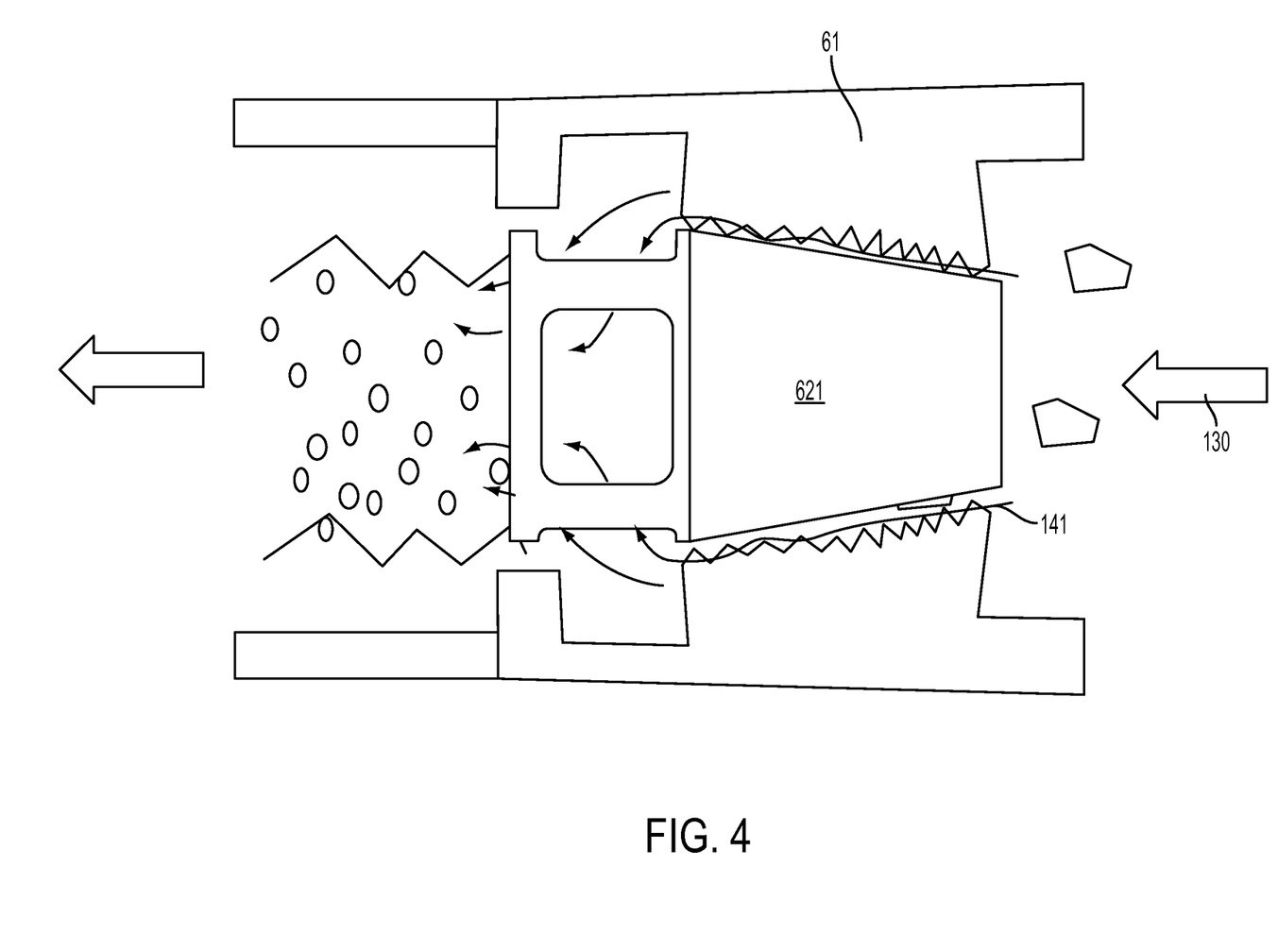
FIG. 4 is a schematic side view of a pressure regulating valve of the lube system of FIG. 1 according to alternative embodiments.

With reference to FIGS. 2, 3 and 4, the PRV 60 includes a valve seat 61, a poppet 62 and an elastic element 63. The poppet 62 is configured to occupy and move between a closed position, at which the poppet 62 abuts the valve seat 61, and an open position, at which the poppet 62 is displaced from the valve seat 61, in accordance with a pressure in the air vent line 140. The poppet 62 may include a plug 621 and a housing 622. The plug 621 may be frusto-conical in shape with the valve seat 61 having a complementarily tapered shape such that the plug 621 can sit within the valve seat 61 to close the PRV 60 when the poppet occupies the closed position. By contrast, when the poppet 62 occupies the open position, the plug 621 is displaced from the valve seat 61 and, in this condition, the second air-oil supply 130 is permitted to flow from an upstream section of the air vent line 140 to a section of the air vent line 140 downstream from the poppet 62 via a flow pathway 141 defined between the plug 621 and the valve seat 61 and through the housing 622.

The elastic element 63 may be provided as a compression spring and is configured to bias the poppet 62 toward the closed position. An elasticity of the elastic element 63 may be provided such that the poppet 62 is more or less responsive to pressure changes in the air vent line 140.

As noted above, when the PRV 60 is closed or nearly closed, the plug 621 sits within or is only slightly displaced from the valve seat 61. The valve seat 61 and the plug 621 thus form a valve seat area 150. The valve seat area 150 has an axial length extending from a forward edge of the valve seat 61 to a rear edge of the plug 621. The flow pathway 141 extends along the valve seat area 150 and is directed radially outwardly along the plug 621 and then radially inwardly at the housing 622.

The valve seat area 150 includes an inlet 151, at which the second air-oil supply 130 enters the valve seat area 150 with a first pressure, and an outlet 152, which is defined downstream from the inlet 151. At the outlet 152, pressure has been reduced from the first pressure. The velocity of the flow between the inlet 151 and the outlet 152 will depend upon the frictional loss and flow path between 151 and 152.

As shown in FIG. 2, the valve seat area 150 is configured to throttle the flow of the second air-oil supply 130 in steps. Here, at least one or both of the valve seat 61 and the plug 621 of the poppet 62 is configured to form a series of axially arranged recesses 160 that are fluidly coupled to the pathway. Thus, as the second air-oil supply 130 flows along the flow pathway 141, at least a portion of the second air-oil supply 130 sequentially flows into the axially arranged recesses 160. This flow pattern creates a staged pressure drop with the second velocity being proportional to the sum of the pressure drop stages and thereby reduced along with the energy of the second air-oil supply 130.

The features illustrated in FIGS. 3 and 4 have similar general structures as the features illustrated in FIG. 2 and like elements need not be described again or identified by repeated reference numerals.

As shown in FIG. 3, the valve seat area 150 may be elongated such that the valve seat area 150 has a longer axial length than the housing 622. Here, a pressure drop through along the flow pathway 141 is taken over a relatively lengthy distance whereby frictional losses caused by the interaction of the second air-oil supply 130 with the plug 621 and the valve seat 61 reduce the velocity and the energy of the second air-oil supply 130.

As shown in FIG. 4, at least one or both of the valve seat 61 and the plug 621 has a roughened, irregular surface that effectively causes the pressure drop along the flow pathway 141 to occur in many relatively small steps. Here, again, the velocity and energy of the second air-oil supply 130 is reduced in a similar manner as described above.

With reference back to FIG. 3, the valve seat area 150 may be configured to throttle back a velocity at which the second air-oil supply 130 flows by flowing the second air-oil supply 130 through labyrinthine passages 153 cooperatively formed by the valve seat 61 and the plug 621. The labyrinthine passages 153 reduce the velocity and the energy of the second air-oil supply 130.

In accordance with further or alternative aspects, the second quantity of oil in the second air-oil supply 130 can be temporarily removed from the second air-oil supply 130 and bypassed around the valve seat area 150. In this way, the valve seat area 150 modifications described above can be used in combination with the bypass or a conventional valve seat area 150 can be employed. In the latter case, in particular, fluid flow along the flow pathway 141 defined along the valve seat area 150 may be maintained at a relatively high velocity since the second quantity of oil is being bypassed around the valve seat area 150 and only re-introduced into the flow of the second air-oil supply 130 in the housing 622 where velocities are reduced. Thus, the oil does not have sufficient velocity or energy to form oil droplets that are too small to be removed by the de-oiler 40.

Figure 5:
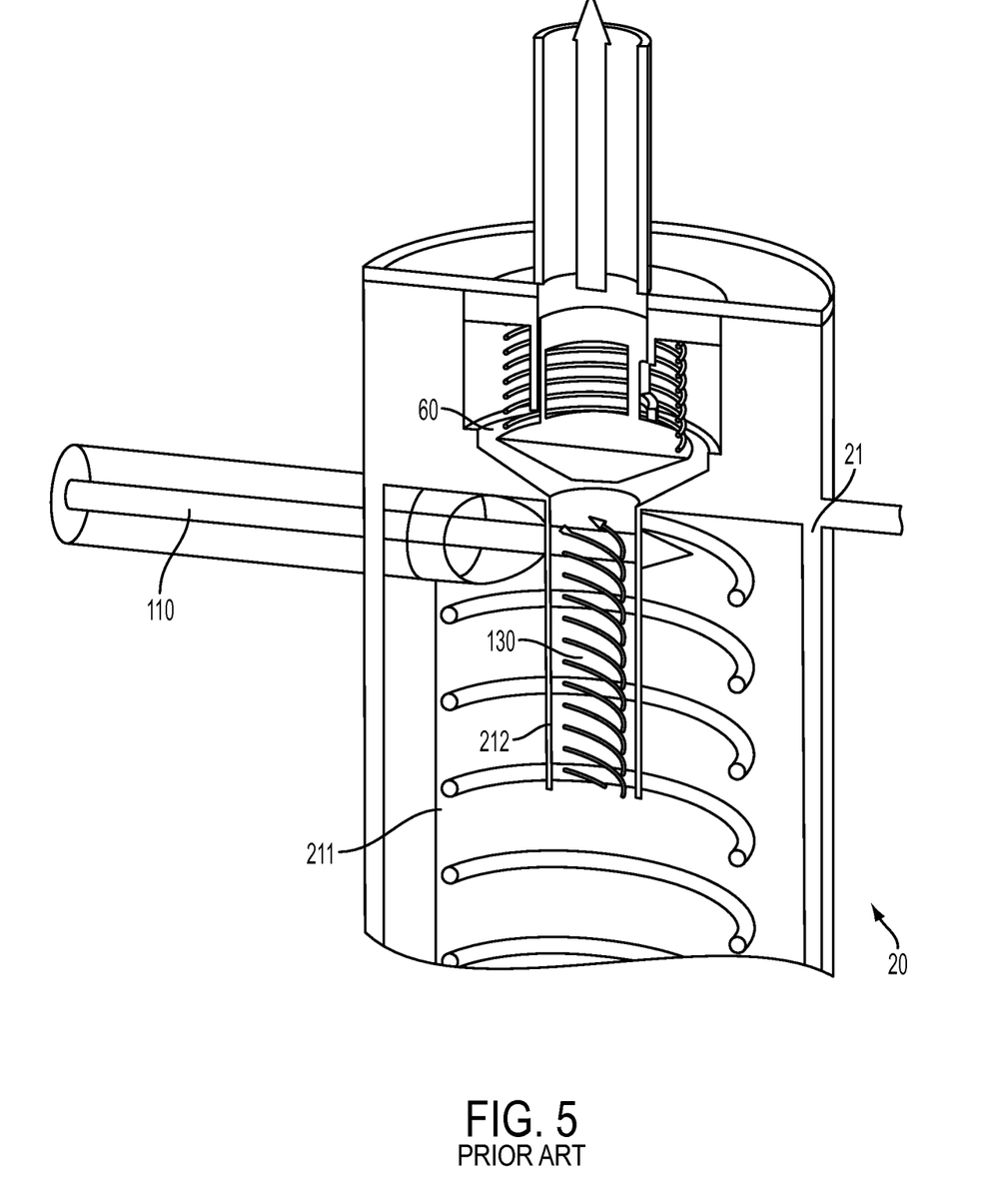
FIG. 5 is a perspective view of a deaerator in accordance with the prior art.

With reference to FIG. 5, a conventional air-oil tank 20 is illustrated with a conventional deaerator 21 installed therein. As shown in FIG. 5, the deaerator 21 includes a vertically oriented outer column 211 surrounding a narrower vertically oriented inner column 212. The first air-oil supply 110 is directed into the deaerator 21 and most of the oil flows along the outer diameter of the outer column 211. The air and some oil flows into the inner column 212 toward the PRV 60 as the second air-oil supply 130. This oil flowing into the inner column 212 remains on the outer diameter of the inner column 212 but is not prevented from flowing through the valve seat area 150 (see FIG. 2) of the PRV 60 in the conventional air-oil tank 20.

Figure 6:
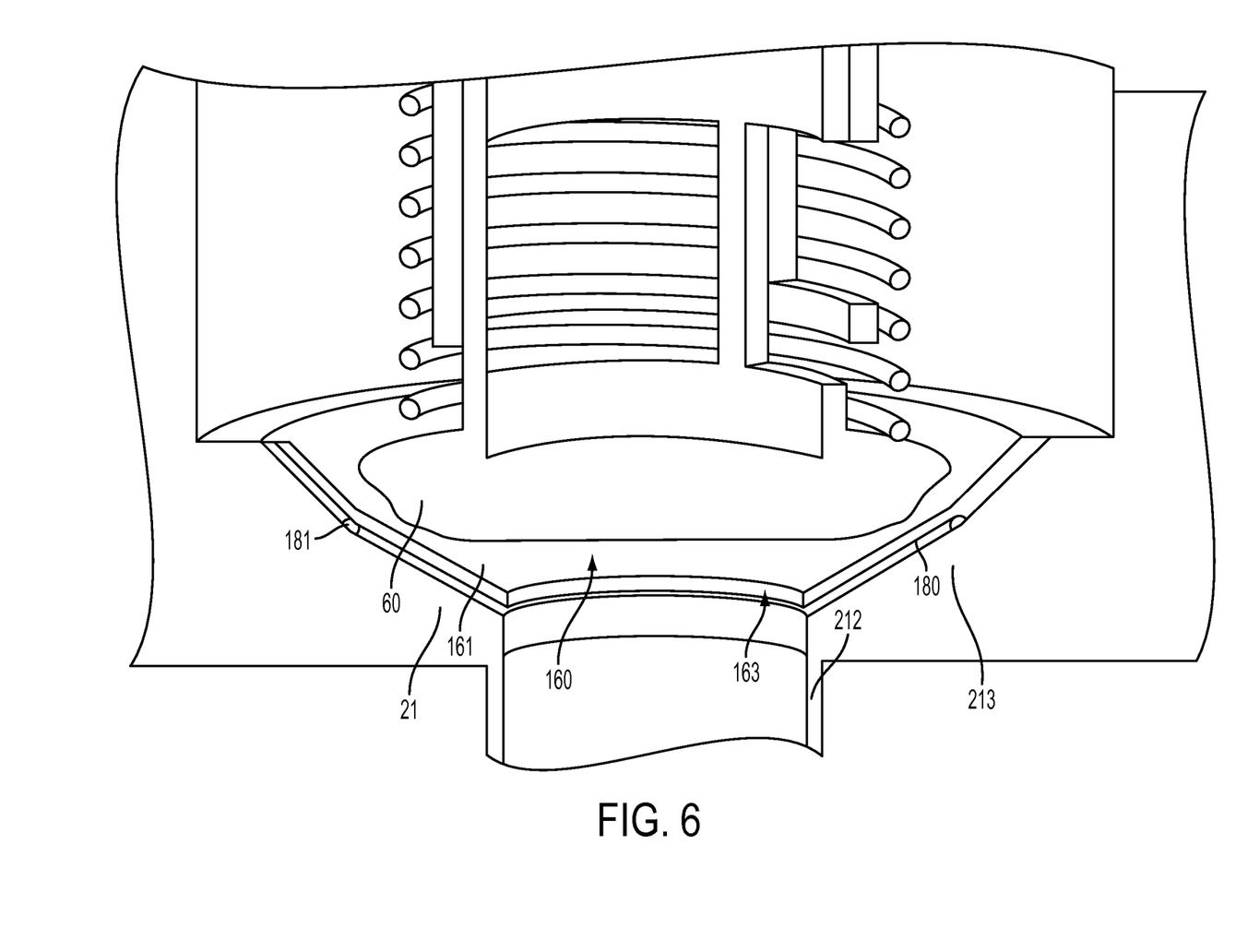
FIG. 6 is a perspective view of a deaerator of the lube system of FIG. 1 including an insert.
Figure 7:
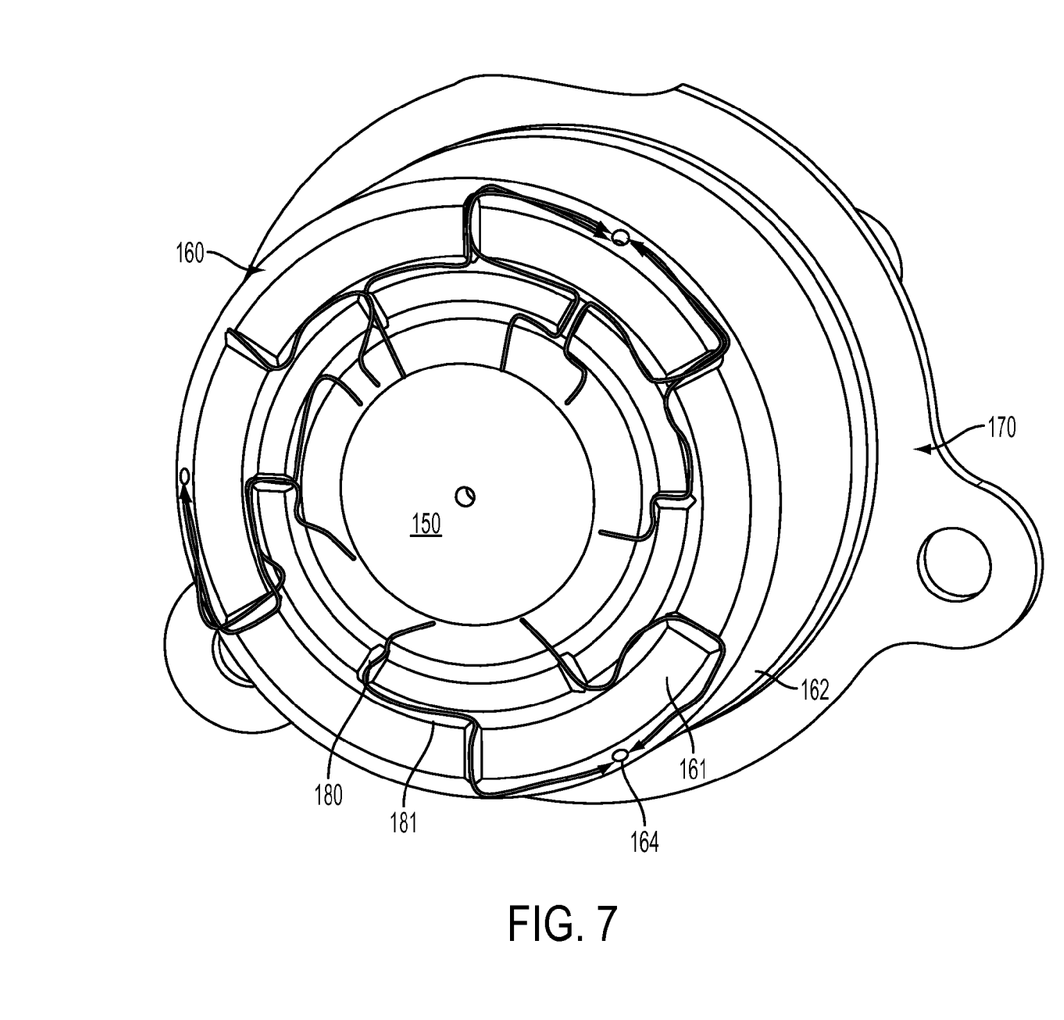
FIG. 7 is a perspective view of the insert and a valve cover of the deaerator of FIG. 6.
Figure 8:
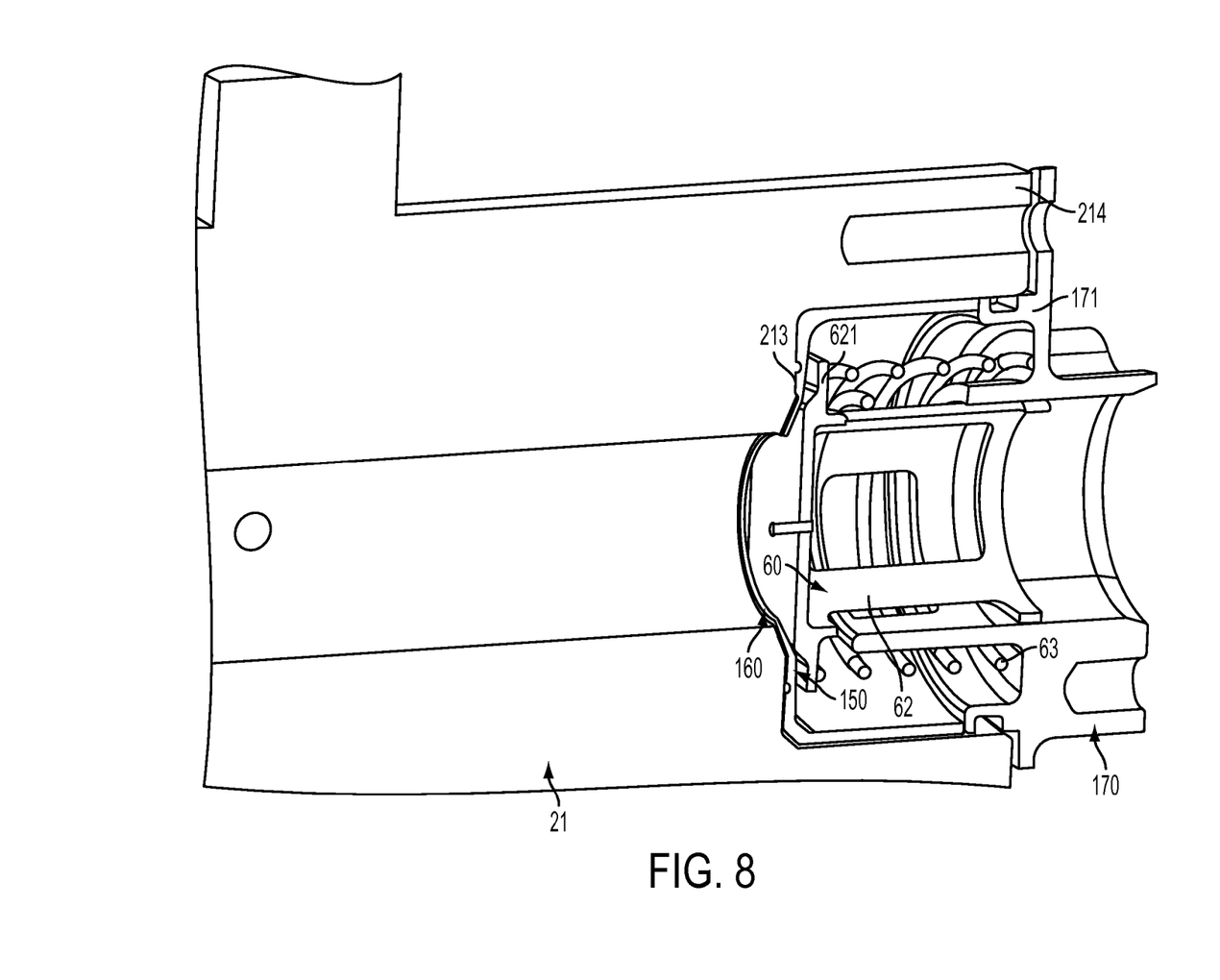
FIG. 8 is a cutaway perspective view of the insert and the valve cover of FIG. 7 as installed on the deaerator of FIG. 6.

With reference to FIGS. 6, 7 and 8, however, an insert 160 is installed between the PRV 60 and the deaerator 21. The insert 160 includes a flange 161 and a rim 162 (see FIG. 7). The rim 162 extends away from an outer diameter of the flange 161 and is secured between a shoulder 213 of the deaerator 21 and a flange 171 of a valve cover 170 (see FIG. 8). The valve cover 170 may be fastened to a rim 214 of the deaerator 21 such that the valve cover flange 171 impinges upon the rim 162 of the insert 160 with the flange 161 of the insert 160 correspondingly impinging upon the deaerator shoulder 213. The elastic element 63 of the PRV 60 is anchored to the valve cover flange 171 and biases the poppet 62 toward the closed position, which, with the insert 160 installed as shown, is now defined as a contact position between the plug 621 and a downstream side of the flange 161.

As shown in FIG. 6, the flange 161 has an angular inner diameter 163, which juts out into the inner column 212. In this way, air is permitted to flow into the PRV 60 via the aperture formed by the inner diameter 163 while the oil in the inner column 212, which flows along the outer diameter of the inner column 212, is forced into a torturous bypass pattern. This bypass pattern is defined by a shape of an upstream side of the flange 161, which is formed to define radial flow paths 180 and circumferential flow paths 181 with the deaerator shoulder 213. The bypassed oil flows radially outwardly along the radial flow paths 180 and circumferentially along the circumferential flow paths 181 (see FIG. 7).

As shown in FIG. 7, at an edge where the flange 161 and the rim 162 meet, the insert 160 is formed to define through-holes 164. The bypassed oil flows through the radial flow paths 180 and the circumferential flow paths 181 and eventually reaches the through-holes 164 by which time the bypassed oil has been substantially reduced in velocity and energy. The bypassed oil then flows through the through-holes 164 and toward the housing 162 at which point it is permitted to re-mix with the air that has already flown through the valve seat area 150. Here, the velocities and energies of the oil and air are insufficient to cause the oil to form into oil droplets that are too small to be removed by the de-oiler 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A lube system, comprising:
   an air-oil tank including a deaerator configured to remove a first quantity of oil from a first air-oil supply to generate a second air-oil supply having a second quantity of oil, which is smaller than the first quantity of oil, the air oil tank being configured to output the second air-oil supply to an air vent line;
   a de-oiler disposed along the air vent line and configured to remove from the second air-oil supply oil mist including oil droplets of a minimum size; and
   a pressure regulating valve (PRV) disposed along the air vent line between the air-oil tank and the de-oiler to regulate fluid pressures within the air-oil tank,
   the PRV being configured to encourage formation of the oil droplets of at least the minimum size by flowing the second air-oil supply through a valve seat area defined by a movable poppet and a valve seat,
   the valve seat defining serially discrete, axially arranged recesses all of which have randomly variable cross-sectional shapes and randomly variable sizes and each recess having radial surfaces and an axial surface extending between angular corners respectively formed by the axial surface with the radial surfaces.

2. The lube system according to claim 1, further comprising a scavenge pump unit configured to pump the first air-oil supply to the air-oil tank.

3. The lube system according to claim 1, further comprising a lube pump section configured to pump at least a portion of the quantity of oil removed from the first air-oil supply from the air-oil tank.

4. The lube system according to claim 1, wherein the valve seat area comprises:
   an inlet, at which the second air-oil supply flows at a first velocity; and
   an outlet downstream from the inlet, at which the second air-oil supply flows at a second velocity, which is throttled back from the first velocity.

5. The lube system according to claim 1, wherein the PRV comprises
   an elastic element configured to bias the poppet toward a closed position.

6. The lube system according to claim 5, wherein at least one of the valve seat and the poppet is configured to form a series of axially arranged recesses.

7. The lube system according to claim 5, wherein a forward portion of the poppet abuts the valve seat when the poppet occupies the closed position and has an axial length that extends beyond a rear portion of the valve seat.

8. A lube system, comprising:
   an air-oil tank configured to output a processed air-oil supply to an air vent line;
   a de-oiler disposed along the air vent line and configured to remove from the processed air-oil supply oil droplets of a minimum size; and
   a pressure regulating valve (PRV) disposed along the air vent line between the air-oil tank and the de-oiler to regulate fluid pressures within the air-oil tank,
   the PRV being configured to encourage formation of the oil droplets of at least the minimum size by flowing the processed air-oil supply through a valve seat area including serially discrete, axially arranged recesses all of which have randomly variable cross-sectional shapes and randomly variable sizes, each recess having radial surfaces and an axial surface extending between angular corners respectively formed by the axial surface with the radial surfaces.

9. The lube system according to claim 8, further comprising:
   a scavenge pump unit configured to pump an initial air-oil supply to the air-oil tank; and
   a lube pump section configured to pump from the air-oil tank at least a portion of a quantity of oil, which is removed from the initial air-oil supply in the air-oil tank.

10. A method of operating a lube system, the method comprising:
    removing within an air-oil tank a first quantity of oil from a first air-oil supply to generate a second air-oil supply having a second quantity of oil, which is smaller than the first quantity of oil;
    removing from the second air-oil supply oil mist including oil droplets of a minimum size; and, prior to the removing of the oil mist, encouraging formation of the oil droplets of at least the minimum size while regulating fluid pressures within the air-oil tank by flowing the second air-oil supply through a valve seat area including serially discrete, axially arranged recesses all of which have randomly variable cross-sectional shapes and randomly variable sizes, each recess having radial surfaces and an axial surface extending between angular corners respectively formed by the axial surface with the radial surfaces.

11. The method according to claim 10, further comprising:
pumping the first air-oil supply to an air-oil tank in which the removing occurs; and
pumping at least a portion of the first quantity of oil removed from the first air-oil supply from the air-oil tank.

\* \* \* \* \*